United States Patent [19]

Wagner et al.

[11] 3,899,454

[45] *Aug. 12, 1975

[54] PROCESS FOR THE PRODUCTION OF SYNTHETIC PLASTICS COMPRISING URETHANE GROUPS AND BIURET GROUPS

[75] Inventors: Kuno Wagner, Leverkusen; Werner Dietrich, Cologne; Karl-Josef Kraft, Leverkusen; Horst Conrad, Durmagen, all of Germany

[73] Assignee: Bayer Aktiengesellschaft, Leverkusen, Germany

[ * ] Notice: The portion of the term of this patent subsequent to Feb. 19, 1991, has been disclaimed.

[22] Filed: May 16, 1973

[21] Appl. No.: 360,883

Related U.S. Application Data

[63] Continuation-in-part of Ser. No. 264,641, June 20, 1972, abandoned, which is a continuation of Ser. No. 036,500, May 11, 1970, abandoned.

[30] Foreign Application Priority Data

May 13, 1969 Germany.......................... 1924302

[52] U.S. Cl...260/2.5 AT; 260/2.5 AG; 260/2.5 AP; 260/77.5 AT
[51] Int. Cl.² .................. C08G 18/79; C08G 18/14
[58] Field of Search.. 260/2.5 AT, 2.5 AP, 77.5 AT, 260/2.5 AG

[56] References Cited
UNITED STATES PATENTS

| | | | |
|---|---|---|---|
| 3,124,605 | 3/1964 | Wagner | 260/2.5 AT |
| 3,367,956 | 2/1968 | Hennig | 260/2.5 AT |
| 3,392,183 | 7/1968 | Windemuth | 260/2.5 AT |
| 3,441,588 | 4/1969 | Wagner | 260/77.5 AT |
| 3,517,039 | 6/1970 | Wagner | 260/2.5 AT |
| 3,591,560 | 7/1971 | Wagner | 260/2.5 AT |
| 3,647,848 | 3/1972 | Wagner | 260/2.5 AT |
| 3,706,678 | 12/1972 | Dietrich | 260/2.5 AT |
| 3,793,268 | 2/1974 | Dietrich | 260/2.5 AT |

Primary Examiner—Melvyn I. Marquis
Assistant Examiner—C. Warren Ivy
Attorney, Agent, or Firm—Gene Harsh

[57] ABSTRACT

A process is provided for the production of synthetic polyurethane plastics, particularly foam plastics, containing biuret groups by reacting polyisocyanates, polyhydroxyl and/or polycarboxyl compounds, flame inhibitors and, if desired, blowing agents, emulsifiers, activators and other additives which is characterized by using as the polyisocyanate solutions in monomeric polyisocyanates of from about 1 per cent to 85 per cent of polyisocyanates containing biuret groups and having the formula:

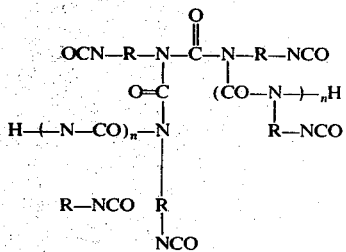

in which
R is an aromatic, araliphatic or cycloaliphatic radical which may, if desired, be substituted and
n is an integer from 0 to 5, wherein the proportion of biuret-polyisocyanates having more than three isocyanate groups is at least 20 per cent by weight based on the total quantity of biuret-polyisocyanates, and the solutions contain from about 0.03 per cent to about 5 per cent by weight of chemically combined emulsifiers.

7 Claims, No Drawings

PROCESS FOR THE PRODUCTION OF SYNTHETIC PLASTICS COMPRISING URETHANE GROUPS AND BIURET GROUPS

This application is a continuation-in-part of copending application Ser. No. 264,641 filed June 20, 1972, now abandoned which application is a continuation of application Ser. No. 036,500 filed May 11, 1970, now abandoned.

Polyurethane plastics, particularly polyurethane foams, have a variety of physical properties and are obtained by the isocyanate polyaddition process from compounds having several active hydrogen atoms and polyisocyanates, activators, stabilizers and other additives, if desired with concurrent use of water and/or other blowing agents. By this procedure it is possible to choose components which will yield elastic and also rigid foam plastics or other plastics having properties which lie between these limits.

It is also known to produce synthetic plastics, particularly foam plastics, which contain urethane groups and biuret groups. For example, according to the disclosures of U.S. Pat. Nos. 3,124,605, 3,392,183, 3,441,588, 3,232,973, 3,284,479, 3,367,956 and of U.S. Pat. Nos. 551,916 and 760,085, a wide variety of low molecular weight polyisocyanates containing biuret groups and their unpurified solutions in monomeric polyisocyanates can be used in accordance with processes known per se for the production of polyurethane synthetic cellular and noncellular plastics. However, the foam plastics containing biuret groups produced by these processes have not been industrially exploitable because of their low compressive strength and heat resistance.

It is therefore an object of this invention to provide polyurethane plastics containing biuret groups and a process for preparing them which are devoid of the foregoing disadvantages.

Another object of this invention is to provide polyurethane plastics containing biuret groups which have a high compressive strength and heat resistance.

Yet another object of this invention is to provide polyurethane foams containing biuret groups which have extremely low weights per unit volume, freedom from shrinkage, excellent powers of insulation and a particularly regular pore structure.

A further object of this invention is to provide a process for the production of polyurethanes containing biuret groups wherein the components can be mixed homogeneously and easily within a short time to preclude premature and undesired reaction.

A still further object of this invention is to provide a process for the preparation of foamed polyurethane plastics containing biuret groups which allows a much more highly uniform distribution of the blowing agent during the foaming operation so that a more regular blowing action and a greater uniformity of foaming can be achieved to yield a finer, more regular pore structure.

An additional object of this invention is to provide a process by which elastic and rigid polyurethane plastics containing biuret groups can be produced as well as polyurethanes having properties which lie between these limits.

The foregoing objects and others which will become apparent from the following description are accomplished in accordance with this invention, generally speaking, by providing polyurethane plastics containing biuret groups which have substantially increased compressive strengths and heat resistance and which are prepared by reacting organic polyhydroxyl and/or polycarboxyl compounds with a solution in monomeric polyisocyanates of from about 1 to about 85 per cent of a polyisocyanate containing biuret groups and having the formula

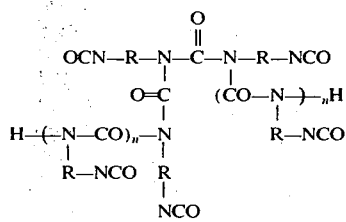

in which R is an aromatic, araliphatic or cycloaliphatic radical which may, if desired, be substituted and $n$ is an integer of from 0 to 5, wherein the proportion of biuret-polyisocyanate having more than three isocyanate groups is at least 20 per cent and preferably 40 to 70 per cent by weight based on the total quantity of biuret-polyisocyanate, and the solutions contain from about 0.03 per cent to about 5 per cent and preferably 0.1 to 2 per cent by weight of chemically combined emulsifiers. If desired blowing agents may be included in the reaction mixture if a cellular structure is desired and/or flame inhibitors, activators, emulsifiers and other additives may also be added.

By the practice of this invention it is now possible to prepare foams having improved compressive strength and heat resistance compared to products produced from monomeric polyisocyanates and biuret triisocyanates. The properties of the foams produced by the process of this invention are improved to such an extent that they may be used industrially although they can be prepared from biuret polyisocyanate products obtained by processes known per se at high temperatures and in the presence of emulsifiers which react with isocyanates. Such biuret polyisocyanates contain a certain proportion of higher molecular weight biuret polyisocyanate having an increased functionally and chemically bonded emulsifiers. Apart from the foregoing advantages it has been found that such biuret polyisocyanates offer other important advantages in the formation of foamed plastics, particularly in the production of semi-hard and hard foams. For example, when producing hard foams by the process of this invention it is possible to prepare cellular plastics which have a lower weight per unit volume together with increased heat resistance, a particularly regular pore structure, freedom from shrinkage, improved compressive strength and excellent powers of insulation. It would appear that the progress of the expanding and setting reactions in the formation of the foam is at least partly responsible for this highly advantageous combination of properties since a controlling factor is the heretofore unknown uniformity and speed with which carbon dioxide is released when using water as a blowing agent in the practice of this invention, even when other blowing agents such as trichloromonofluoromethane are also used.

Various advantages are also provided in the actual process for the production of foam plastics. When using only monomeric liquid polyisocyanates, the mixing of the foam-forming components with the polyhydroxyl and the like compounds, which are always of high viscosity, is frequently difficult and often requires relatively long time periods in order to achieve the necessary homogeneity. As a consequence, premature and undesired reactions which have an undesirable effect on the final product can take place. The biuret-polyisocyanate systems containing chemically combined emulsifiers used in the process of this invention are conveniently and surprisingly highly effective solution promoters and can be mixed easily in the shortest possible time with the other components of the reaction mixture to preclude undesired premature reactions which would otherwise take place in a non-homogeneous reaction mixture. It was also surprising to find that the setting and expanding times during the foaming process in the practice of this invention are more favorable compared to the setting and expanding times of normal commercial systems, thus yielding a greater uniformity of foaming.

An additional advantage of the process of this invention is that the water used as blowing agent is distributed much more uniformity during the foaming operation and a more regular blowing action is obtained so that foam plastics having a finer, more regular pore structure are produced.

The biuret-polyisocyanate systems containing chemically combined emulsifiers to be used in the practice of this invention can be prepared in a manner known per se by any of the processes described, for example, in U.S. Pat. Nos. 3,124,605, 3,232,973, 3,441,558, 3,383,400, 3,284,479, 3,367,956, 3,392,183, 3,350,438, 3,517,039 and 3,647,848 from any chosen polyisocyanates. In one preferred embodiment, the biuret-polyisocyanate mixtures having a relatively high NCO functionality are advantageously prepared by reacting the water or compound which splits off water with the polyisocyanate starting material in the presence of from about 0.03 to about 5 per cent by weight, and preferably from about 0.1 to about 2 per cent by weight, of emulsifiers containing OH, amino, amido, —COOH, —SH or urethane groups reactive with NCO groups. The emulsifier which is operative even at a very low concentration in a very large excess of monomeric polyisocyanates thus reacts with the isocyanate and is transformed into an emulsifier containing isocyanate groups. It is immaterial whether the emulsifier is introduced with water, for example, or whether is added to the monomeric polyisocyanate starting material before the formation of biuret groups begins. By choosing suitable concentration ratios of the reactants to the monomeric isocyanates and by controlling the temperature, it is possible to obtain clear mixtures which are stable on storage and which have increased NCO functionality.

The content of biuret polyisocyanates having a functionality of four to six or higher can easily be increased by continuously introducing small quantities of water into an approximately 50 per cent solution of biuret triisocyanates in monomeric dissocyanates such as tolylene diisocyanates, for example. Because of their high concentration, the already formed biuret triisocyanates largely react further to form polyisocyanates which are completely soluble in the mixture at room temperature and which have a functionally of four to six or higher.

The proportion of higher molecular weight biuret polyisocyanates can also be increased simply by heating to temperatures from about 160° to about 180°C. The proportion by weight of higher molecular weight biuret polyisocyanate can be established by fractional precipitation and chromatographic analysis.

For the production of the polyisocyanate mixtures of this invention, the biuret polyisocyanates are dissolved in liquid monomeric polyisocyanates. It is preferred to use unpurifed solutions of the biuret polyisocyanates in monomeric polyisocyanates and to actually prepare the required concentration of the polyisocyanate mixture when producing the biuret polyisocyanates. This can be done, for example, by preparing highly concentrated solutions which, if required, are diluted with the various types of monomeric polyisocyanates and further diluted to the required biuret polyisocyanate content.

If desired, however, the polyfunctional polybiuret polyisocyanates can also be prepared by heating a, w-diisocyanates containing one or more urea groups in excess monomeric polyisocyanates or polyisocyanate mixtures to temperatures in the region of 180°C. in a first step. Solution occurs and reaction to form polybiuret-polyisocyanates of higher molecule weight takes place. Such polybiuret-polyisocyanates can be used for the production of the foam materials of this invention in combination with various types of di- and polyisocyanato urethane, which can be obtained by reacting an excess of a diisocyanate with low molecular weight triols or diols and, if desired, with soluble polyisocyanates containing isocyanurate groups. Mixtures of such polybiuret-polyisocyanates which have been oxidized and modified at high temperatures by the action of oxygen with the formation of hydroperoxide groups can also be used, as well as those polybiuret-polyisocyanates obtained by gassing polyisocyanates with air or oxygen in the presence of tin tetrachloride, iron chloride, copper and zinc complexes of Schiffs bases from stearylamine and salicylaldehyde.

Biuret-polyisocyanate solutions which are particularly important technically and, hence, preferred in the practice of this invention for producing synthetic polyurethane plastics, particularly foam plastics, are biuret-polyisocyanate mixtures such as those obtained by the action of e.g. water on aromatic, araliphatic, cycloaliphatic and aliphatic polyisocyanates such as, for example, 1-methylbenzene-2,4-diisocyanate, 1-methylbenzene-2,6-diisocyanate as well as their technical mixtures, arylene diisocyanates and their alkylation products, m- and p-phenylene diisocyanates, naphthylene diisocyanates, diphenylmethane diisocyanates, di- and triisopropylbenzene diisocyanates, triphenylmethane triisocyanates, thiophosphoric acid tri-(p-isocyanatophenyl)-esters, phosphoric acid trip-isocyanatophenyl)-esters, aralkyl diiscyanates such as 1-(isocyanatophenyl)-ethyl isocyanate, m- and p-xylylene diisocyanate, alkylene diisocyanate, alkylene diisocyanates such as tetra- and hexamethylene diisocyanates, trimethylhexamethylene diisocyanate, isophorone diisocyanate, 1-methylcyclohexyl-2,4-diisocyanate and isomers thereof, a, w-diisocyanatocarboxylic acid esters, polyisocyanates substituted by any different substituents such as, for example, alkoxy, nitro, chlorine or bromine groups. Addition products of polyisocyanates with less than equivalent quantities of polyhydroxyl compounds, such as trimethylol propane, hexanetriol, glycerine, butane diol and the like as well as polymerization products of the aforesaid polyisocyanates with several isocyanurate rings per molecule, if desired, addition products of 2 to 8 mols of any polyisocyanate with one mole of an aldimine or ketimine and polyisocyanates which are obtainable by aniline-formaldehyde condensation and subsequent phosgenation are suitable for the production of modified biuret types.

Higher molecular weight polyisocyanates which can be produced by reacting monomeric polyisocyanates with higher molecular weight compounds containing hydrogen atoms reaction with NCO groups including higher molecular weight polyhydroxyl compounds, polycarboxyl compounds and polyamino compounds can also be used. Mixtures of different polyisocyanates can also be used for forming biuret groups. Diphenylmethane diisocyanates containing carbodiimide groups or uretonimine groups as described, for example, in German Pat. No. 1,092,007 and 4,4'-diphenylmethane diisocyanate modified by less than equivalent quantities of dipropylene glycol and tripropylene glycol which are liquid and technical isomers thereof are also eminently suitable for the production of biuret-polyisocyanates. Polyisocyanates containing semicarbazide groups and biuret groups produced as described, for example, in U.S. Pat. Appln. Ser. No. 760,085, from the unsymmetrically disubstituted hydrazines, for example, are also suitable. These biuret-polyisocyanates are valuable antioxidants and color stabilizers under heat and aging conditions for polyurethane foam plastics and synthetic plastics. Modified polyisocyanates obtained by the telomerization of ethylenically unsaturated compounds with polyisocyanates are also very suitable for the production of the biuret-polyisocyanates to be used in the practice of this invention. Biuret-polyisocyanate mixtures obtainable by hydrogenation polyaddition reactions such as those which are prepared by hydrogenating polynitro compounds and polynitriles in the presence of excess quantities of monomeric polyisocyanates, for example, are likewise suitable.

Monomeric polyisocyanates which are eminently suitable for the production of biuret-polyisocyanates are 1-methylbenzene-2,4-diisocyanate, 1-methylbenzene-2,6-diisocyanate and its technical isomer mixtures such as, for example, mixtures of 80 to 65 parts by weight of 1-methylbenzene-2,4-diisocyanate and 20 to 35 parts by weight of 1-methylbenzene2,6-diisocyanate. When using biuret-polyisocyanates prepared from tolylene diisocyanates, in the process of this invention for the production of foam materials it is particularly surprising that by choosing suitable polyhydroxyl and/or polycarboxyl compounds, hard foam plastics having improved heat stability and a more uniform pore structure can be obtained compared to similarly produced foam plastics prepared from the same polyols and polyisocyanates obtained by the phosgenation of aniline-formaldehyde condensates. However, 4,4'-diisocyanatodiphenylmethane, its technical isomers and the technical crude distillates of these mixtures are also excellent for use in the formation of readily soluble, liquid biuretpolyisocyanates of relatively high molecular weight.

Excellent reactive emulsifiers having at least one hydrogen atom reactive with NCO groups to be used in the production of the biuretpolyisocyanate systems of this invention include, for example, hydroxyl containing oleyl alcohol polyglycol ethers, castor oil polyglycol ethers, isononylphenol polyglycol ethers, 3-benzyl-4-hydroxy-diphenyl polyglycol ethers, higher molecular weight n-dodecyl polyglycol ethers, for example, having an average molecular weight of about 2,000, and a terminal OH group, emulsifiers containing amino terminal groups corresponding to the foregoing examples with amine terminal groups such as those which can be obtained by cyanoethylation and subsequent hydrogenation of the aforesaid emulsifiers. The various ammonium salts of oleic acids and long-chain fatty acids and their salts with primary and secondary amines are likewise eminently suitable since they dissociate in the polyisocyanate starting material and the amines react as ureas while the longer chain carboxylic acids are transformed into isocyanato-acyl amide derivatives.

The higher molecular weight biuret-polyisocyanate mixtures of this invention in dissolved form are generally solid or resin-like compounds or more or less viscous oils at room temperature. They have a surprisingly high solubility in monomeric liquid diisocyanates and polyisocyanates such as tolylene dissocyanates or polynuclear liquid or melted polyisocyanates such as 4,4'-diisocyanatodiphenyl methane, its technical isomers and liquid modifying agents which contain carbodiimide groups as well as dicyclohexylmethane-4,4'-diisocyanate, diphenyldimethylemthane4,40 -diisocyanate, 4,6-dimethyl-1,3-xylylene diisocyanate, 2,6-diethylbenzene-1,4-diisocyanate, m- and p-xylylene dissocyanates, isophorone diisocyanate, hexamethylene diisocyanate, tetramethylene diisocyanate and the like and mixtures thereof. Moreover, the biuret-polyisocyanates of this invention have excellent compatibility and miscibility with adducts of any chosen polyisocyanate and low molecular weight polyols such as, for example, trimethylol propane and glycerine, said adducts comprising different types of isocyanate groups, and they are also miscible with polymerized low molecular weight polyisocyanates which may contain several isocyanaurate rings in the molecule, if desired.

The biuret-polyisocyanate solution in monomeric polyisocyanates used in the practice of this invention are liquid, clear, storable mixtures having preferably a viscosity of between about 10 and about 100,000 and most preferably 20 to 10,000 centipoises measured at 21°C., for example, in the case of the preferred polyisocyanates which are based on tolylene diisocyanate or on 4,4'-diisocyanatodiphenyl methane, with 45 to 50 per cent by weight solutions. Their mixtures with one another and also in liquid industrial polyisocyanates which are obtained by the phosgenation of aniline-formaldehyde condensates are also of a relatively low viscosity. When using 65 to 70 per cent by weight solutions, it is also advantageous that relatively low viscosities of from about 1,400 to about 2,000 centipoises, measured at the same temperature are found.

The biuret-polyisocyanate solutions used in the process of this invention are employed in varying quantities depending upon whether rigid or elastic foam plastics are to be produced. Generally, the proportion of liquid monomeric polyisocyanate is kept low when highly crosslinked, rigid foam plastics are required while, on the other hand, more monomeric polyisocyanate is used as a solvent when the aim is to produce elastic type products. In each case, it is desirable to adjust the polyisocyanate mixtures so that the solutions are liquid at room temperature. Generally speaking, the quantities of biuret-polyisocyanate mixtures introduced amount to from about 1 to about 85 per cent by weight based on the total weight of the isocyanate solution.

Any suitable compounds containing hydroxyl and/or carboxyl groups may be reacted with the polyisocyanate solutions of this invention, especially when foam plastics are to be produced. Polyhydroxyl compounds are usually those having molecular weights of from about 500 to about 3500 including, for example, polyesters, polyethers, polythioethers, polyacetals, polycarbonates, polyester amides and the like and mixtures thereof containing several hydroxyl groups such as those which are known per se for the production of homogeneous or cellular polyurethanes as listed, for example in U.S. Pat. Nos. 3,201,372 and 3,275,674.

Some particular hydroxyl polyesters which may be used include, for example, reaction products of polyhydric alcohols with polyvalent carboxylic acids such as those which are used in many application in industry. Instead of the free carboxylic acids, it is also possible to use the corresponding anhydrides or esters of the polycarboxylic acids or mixtures of these compounds for the production of the hydroxyl polyesters. The polycarboxylic acids can be aliphatic, cycloaliphatic, aromatic and heterocyclic compounds which may be substituted and/or unsaturated, if desired. Some such suitable acids include succinic acid adipic acid, sebacic acid, phthalic acid, isophthalic acid, phthalic anhydride, maleic acid, maleic anhydride, monomeric, dimeric and trimeric fatty acids, dimethyl terephthalate and the like and mixtures thereof. Some specific examples of polyols which can be used include ethylene glycol, propylene 1,3-glycol, butylene-1,4-glycol, butylene-2,3-glycol, glycerine, trimethylol propane, hexane-1,2,6-triol, butane-1,2,4-triol, trimethylol ethane, pentaerythritol, mannitol, sorbitol, methyl glycoside, polyethylene, polypropylene and polybutylene gylcols and the like and mixtures thereof. Polyesters having terminal carboxyl groups are likewise suitable for reaction with the polyisocyanates in accordance with the invention.

The hydroxyl polyethers suitable for use in the practice of this invention are also those of the type known per se and include, for example, the polymerization products of epoxides such as ethylene oxide, propylene oxide, butylene oxide, styrene oxide or epichlorohydrin with starting materials having reactive hydrogen atoms such as, for example, alcohols or amines including glycerine, trimethylol propane, ethylene glycol, ammonia, ethanolamine, ethylene diamine and the like and mixtures thereof. Sucrose polyethers can also be used in the practice of this invention. Some further suitable organic polyhydroxyl compounds which may also be used in the practice of this invention are described, for example, in "Polyurethanes, Chemistry and Technology," Volumes I and II, Saunders and Frisch, Interscience Publishers, 1962 and 1964 (page 32f, Volume I and page 5 and page 198f, Volume II) and also in the Kunststoff Handbuch, Vol, VII, Vieweg-Hochtlen, Carl-Hanser Verlag, Munich, 1966, for example on pages 45 to 71. Epoxy resins, hydrogenation products of ethylene-olefine-carbon monoxide copolymers, phenolformaldehyde, ureaformaldehyde resins reacted with alkylene oxides and the like can also be used. Low molecular weight polyhydroxyl compounds of the type already mentioned, for example, and/or chain lengthening agents such as glycols, diamines, water aldimines, ketimines and the like can be concurrently used in portions.

The production of the foam plastic itself is effected by known processes at room or elevated temperature simply by mixing the polyisocyanate mixtures with the carriers of the hydroxyl and/or carboxyl groups, and water, accelerators, emulsifiers and other auxiliaries such as flameinhibiting substances and blowing agents. It is advantageous for this purpose to use machine such as those described, for example, in U.S. Pat. Re. No. 24,514.

Any of the large number of suitable flame-inhibiting substances known in the prior art which contain phosphorus and halogen atoms may be added to the reaction mixture. Antimony, bismuth or boron compounds are also know for this purpose. A review of known and useful flame inhibitors which may be employed is given in the chapter "Flammhemmende Substanzen," pages 110–111 in Kunststoff Handbuch, Vol. 7, "Polyurethanes," by Vieweg-Hochtlen, Carl-Hanser Verlag, Munich, 1966. The flame inhibitors are usually employed in quantities of from about 1 to about 20 per cent by weight, and advantageously from about 1 to about 15 per cent by weight, based on the quantity of polyisocyanate mixture being used.

Any desired blowing agents may be employed including, for examples, alkanes, haloalkanes, low-boiling solvents in general and the like such as, e.g., methylene chloride, monofluorotrichloromethane, difluorodichloromethane, acetone, methylformate and any of those listed in U.S. Pat. No. 3,201,372. Compounds releasing gas at a relatively high temperature such as azo compounds or diurethanes of bis-semiacetals formed from 2 mols of formaldehyde and 1 mol of ethylene glycol can also be used as blowing agents.

Any desired urethane activators can be used including, for example, tertiaty amines, such as triethylamine, dimethylbenzylamine, tetramethylethylene diamine, n-alkyl morpholines, endoethylene piperazine, urotropine, hexahydrotriazine, such as trimethylhexahydrotriazine, 2,4,6-dimethylaminomethyl phenol or organic metal salts, such as tin-(II)-acylates, e.g. tin-(II)-salts of 2-ethylcaproic acid, dialkyltin-(IV)-acylates, such as dibutyl-tin-dilaurate or acetyl acetonates of heavy metals, e.g. of iron and the like including those catalysts listed in U.S. Pat. No. 3,201,372.

Any desired emulsifiers may be used including ethoxylated phenols, higher sulphonic acid, sulphonated castor oil, ethoxylated castor oil, sulphonated ricinoleic acid, ammonium salts of oleic acid and the like. Any desired foam stabilizers can be used including, for example, those which are based on polysiloxane-polyalkylene glycol copolymers or basic silicone oils. Other emulsifiers, catalyst and additives which can be used are, for example, listed in "Polyurethanes, Chemistry and Technology," Vols, I and II, Saunders and Frisch, Interscience Publishers, 1962 and 1964.

The quantities of polyisocyanate solutions containing biuretpolyisocyanates which are used should generally be sufficient so that the number of NCO groups is at least equivalent to the sum of reactive hydrogen atoms which are present although, if required, the NCO groups can also be used in excess or in a less than an equivalent quantity. When foam plastics are being produced and water is used as a blowing agent, an excess of polyisocyanate sufficient to react with the water to blow the foam is used. Excess quantities of isocyanates can be incorporated into the foam plastic during the foaming process by adding trivalent or pentavalent phosphorus compounds such as phospholidines, phospholine oxides, tertiary esters, amides or ester amides of phosphorus or phosphoric acid as isocyanurate groups, uretdione groups and/or carbodiimide groups.

The foam plastics which are obtained by the process of this invention can be widely used, for example, in the building industry as building boards, sandwich elements, ceilings, partitions; for heat insulation in refrigerators, cold-storage plants, refrigerated trucks and containers; in road and rail construction for technical insulation of pipes, for the insulation of tank storage installations and in ship construction as air filters and filters for hydrocarbons in internal combustion engines as well as for packaging material for protection against impacts. The foam plastic products obtained by the process of this invention can be hard, semi-hard or flexibe, so that they can also be used as upholstery material. It is also possible to employ the process of this invention to manufacture semi-hard and mold-foamed polyurethane plastics having a compact surface and a cellular core. Surprisingly in such a process, smooth, homogeneous and heat-resistant marginal zones and cellular cores are obtained, so that the improved heat-resistance and compressive strength of these products provide a considerable technical advance, for example, in the insulation of pipe conduits for superheated steam.

The invention is further illustrated but is not intended to be limited by the following examples in which all parts and precentages are by weight unless otherwise specified.

EXAMPLES 1

A. Production of Biuret-Polyisocyanate Solution in Monomeric Polyisocyanate

About 1218 parts of 1-methylbenzene-2,4-diisocyanate in which about 1,5 parts of a caster oil polyethylene glycol ether (OH-number 40) have been dissolved, are heated to about 98°C. About 27 parts of water are constantly introduced dropwise over a period of about 2½ hours with good stirring. On completion to the addition of water, the temperature is raised to about 165°C. for about 45 minutes. Cooling then takes place and a solution of starting material is obtained which is approximately 67 per cent biuret-polyisocyanate mixture and which has a viscosity of 1580 centipoises at 21°C. The NCO content of the solution is 34.6 per cent.

For analytical examination, this solution is freed from monomeric 1-methylbenzene-2,4-diisocyanate at about 135°C/0.2 mm Hg by thin-film evaporation. The NCO content of the biuret-polyisocyanate resin is 24.8 per cent. About 100 parts of the resin are dissolved in 300 parts by weight of a mixture of ethyl acetate/ acetone (1:1) and divided into eight fractions by adding each time 120 parts of cyclohexane and removing the precipitates formed.

Each fraction has an NCO content of from about 24.3 per cent to about 25.3 per cent. However, after the fractions have been converted into polyurethanes using ethanol as a monoalcohol, they differ in their osmotically measured molecular weight. Thereafter, about 34 per cent of the biuret-polyisocyanate resins consist of tetraisocyanates and pentaisocyanates and about 65 per cent by weight of triisocyanate; namely N,N',N''tri-(3-isocyanato-4-methylphenyl)-biuret, the triethyl urethane of which has a molecular weight of about 660 (calculated 634).

B. Production of a Polyester Foam Plastic From the Solution of Biuret Polyisocyanate Starting Material A About 80 parts of a polyester obtained from 5.1 mols of adipic acid, 1 mol of phthalic anhydride and 8.4 moles of hexane triol and having an hydroxyl content of 8.5 per cent are mixed with about 20 parts of a polyester obtained from 1.43 mols of adipic acid, 1 mol of hexane triol and 1 mol of butylene-1,3-glycol with an hydroxyl content of 6.5 per cent and thoroughly stirred together with an activator mixture of about 2 parts of an ester obtained from 2 mols of diethyl ethanolamine and 1 mol of adipic acid as well as 5 parts of about a 54 per cent aqueous solution of the sodium salt of castor oil sulphate. While stirring well, about 107 parts of the solution described above under A, which has an NCO content of 34.6 per cent, is added. Uniform foaming takes place and a hard foam plastic containing urethane and biuret groups is obtained which is characterized by the following properties:

| | |
|---|---|
| Weight per unit volume kg/m³ | 34 |
| Compressive strength (kg/cm²) | 2.4 |
| Heat stability (°C.) | 164 |

The modified polyisocyanate mixture can be very easily incorporated into the above polyester mixture and pore formation is uniform.

When compared against biuret-triisocyanate solutions in excess tolylene diisocyanate as described in Example 1 of British Pat. No. 889,050, the physical properties of the foam plastic obtained using the process of this invention show a substantial improvement in compressive strength and heat stability. For example, in Example 1 of British Pat. No. 889,050, 503.7 parts of 2,4-tolylene diisocyanate (strength 99.4 per cent) were stirred under nitrogen while a solution of 5.4 parts of water in 80 parts of acetone was added at 35° to 37°C. during 1 hour. The slightly exothermic reaction was controlled by occasional external cooling. The thick suspension was stirred at 35° to 37°C. for a further three hours, then raised to 155° to 160°C. during about 1 hour, while removing acetone by distillation. The reaction mixture was maintained at 155° to 160°C. during another 2 hours. The resulting approximately 30 per cent solution of triisocyanato-N,N',N'' trisubstituted biuret in excess tolylene diisocyanate was a clear mobile liquid containing 40.7 per cent isocyanate groups. When 90 parts of this product was stirred well with the polyol-mixture described above under A, a hard foam plastic is obtained which is characterized by the following properties:

| | |
|---|---|
| Weight per unit volume kg/m³ | 32 |
| Compressive strength (kg/cm²) | 1.5 |
| Heat stability (°C.) | 148 |

EXAMPLE 2

A. Production of a Biuret-Polyisocyanate Solution in Monomeric Polyisocyanates About 1050 parts of a technical isomer mixture of tolylene diisocyanate containing about 80 per cent of 1-methylbenzene-2,4-diisocyanate and about 20 per cent of 1-methylbenzene-2,6-diisocyanate into which had been previously stirred about 2 parts of a castor oil polyethylene glycol ether (OH-number 40). About 20.8 g. of water are then introduced dropwise at about 60°C. over about 30 minutes with stirring and the precipitate which forms is dissolved during subsequent heating at about 170°C. After maintaining the temperature for about 3 hours at about 170°C., the solution is quickly cooled to room temperature. The product thus obtained has an NCO content of 33.7 per cent and a viscosity (25°C.) of 3,000 cP.

B. Production of a Polyether Hard Foam Plastic

About 100 parts of a sorbitol polyether having an OH number of 480 and obtained by reacting sorbitol with propylene oxide are mixed with about 40 parts of trichloromonofluoromethane, about 1 part of a silicone stabilizer, and about 1 part of endoethylene piperazine and the mixture is thoroughly stirred with about 107 parts of the biuret-polyisocyanate of part A with an NCO content of 33.7 per cent. Uniform foaming takes place and a hard foam plastic containing urethane and biuret groups is obtained which has the following properties:

*) (SF 1109 of General Electric)

| | |
|---|---|
| Weight per unit volume (kg/cc) | 30 |
| Compressive strength (kg/cm$^2$) | 3.3 |
| Heat stability (°C.) | 147 |

The foam plastic is dimensionally stable for more than three hours at −30°C. and more than 5 hours at +100°C.

EXAMPLE 3

A. Production of a Biuret-Polyisocyanate Solution

About 150 parts of a technical isomer mixture of about 80 per cent 1-methylbenzene-2,4-diisocyanate and about 20 per cent 1-methylbenzene-2,6-diisocyanate into which about 2 parts of a castor oil polyethylene glycolether (OH-number 40) had been stirred previously are treated with about 36.8 parts of water which is introduced dropwise at about 60°C over and about 30 minutes with stirring. The mixture is then heated to about 170°C, which temperature is maintained for about 3 hours. To the reaction product thus obtained is added an equal quantity by weight of a phosgenated aniline-formaldehyde condensate, containing about 50 per cent of 4,4'-diisocyanate diphenylmethane and about 50 per cent of polymeric MDI.

B. Product of Hard Polyether Foam

About 108 parts of the polyisocyanate mixture prepared as described in Example 3A are foamed as described in Example 2B with about 90 parts of a sucrose polyether obtained by reacting sucrose with propylene oxide and having an OH number of 380, about 10 parts of N,N-dihydroxyethyl amino methane phosphonic acid diethyl ester, about 10 parts of trichlorethyl phosphate, about 40 parts of trichloromonofluoromethane, about 1 part of endoethylene piperazine and about 1 part of a silicon stabilizer (Sf 1109 of General Electric).

The hard foam thus obtained has the following properties:
Weight per unit volume (kg/cc)    30

| | |
|---|---|
| Compressive strength (kg/cm$^2$) | 2.5 |
| Heat stability (°C.) | 117 |

The foam plastic was self-extinguishing according to ASTM/D

EXAMPLE 4

A. About 1000 parts of pure 4,4-diisocyanato diphenylmethane in which 5 parts of castor oil polyethylene glycolether (OH—number 40) are dissolved are reacted with 16,2 parts of water like described in Example 1 A. A liquid biuret polyisocyanate is obtained which has an NCO-content of 22,8 per cent.

B. About 100 parts of a sorbitol polyether having an OH—number of 480 and obtained by reacting sorbitol with propylene oxide are mixed with about 1 part of silicon stabilizer (Sf 1109 of General Electric), about 40 parts of monofluortrichloromethane, about 1 part of endoethylene piperazine and the mixture is thoroughly stirred with 160 parts of the biuretpolyisocyanate of Example 4A. The hard foam plastic thereby obtained has the following properties:

| | |
|---|---|
| Weight per unit volume (kg/cc) | 38 |
| Compressive strength (kg/cm$^2$) | 4.3 |
| Heat stability (°C.) | 134 |

The foam plastic was dimensionally stable for more than 3 hours at −30° and more than 5 hours at +100°C.

It is to be understood that any of the components and conditions mentioned as suitable herein can be substituted for its counterpart in the foregoing examples and that although the invention has been described in considerable detail in the foregoing, such detail is solely for the purpose of illustration. Variations can be made in the invention by those skilled in the art without departing from the spirit and scope of the invention except as is set forth in the claims.

What is claimed is:

1. A process for the production of polyurethane foams which comprises reacting in the presence of a blowing agent an organic polyisocyanate with a polyhydroxyl polyether containing from four to six hydroxyl groups, a polycaboxyl compound or a mixture of polyhydroxyl polyether containing from four to six hydroxyl groups and polycarboxyl compounds wherein the polyisocyanate is a solution in a monomeric polyisocyanate of from about 1 to about 85 percent of a biuret polyisocyanate having the formula:

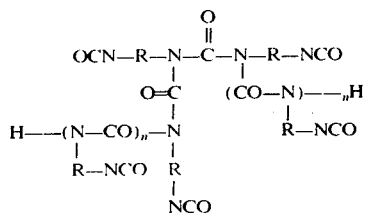

in which
R is an aromatic, araliphatic or cycloaliphatic radical and wherein n is an integer of from 0 to 5 and the proportion of biuret-polyisocyanate having more than three isocyanate groups is at least 20 percent by weight based on the total quantity of biuretpolyisocyanates and the solution contains from about 0.03 to about 5 percent by weight of the polyisocyanates of a chemically combined emulsifier selected from the group consisting of hydroxyl containing oleyl alcohol polyglycol ether, castor oil polyglycol ether, isononylphenol polyglycol ether, 3-benzyl-4-hydroxy diphenyl polyglycol ether, higher molecular weight n-dodecyl polyglycol ethers having a terminal OH group and the corresponding amine derivatives obtained by cyanoethylation and subsequent hydrogenation of the foregoing compounds.

2. The process of claim 1 wherein the solution of the biuretpolyisocyanate contains organic polyisocyanates containing urethane groups.

3. The process of claim 1 wherein the solution of the biuretpolyisocanate contains organic polyisocyanates containing isocyanurate groups 4. The process of claim 1 wherein the proportion of the biuret-polyisocyanate having more than three isocyanate groups is from about 40 to about 70 percent by weight based on the total quantity of biuret-polyisocyanate.

5. The process of claim 1 wherein the solution contains from about 0.1 to 2 percent by weight of said chemically combined emulsifiers.

6. The process of claim 5 wherein the reaction mixture contains liquid plasticizers, flame inhibiting agents or a combination of liquid plasticizers and flame inhibiting agents.

7. The product of the process of claim 1.

* * * * *